(12) United States Patent
Tafoya et al.

(10) Patent No.: US 7,164,211 B1
(45) Date of Patent: Jan. 16, 2007

(54) VEHICLE ASSISTED POWER GENERATOR

(76) Inventors: Craig A. Tafoya, 2107 Mariner Dr., Ft Lauderdale, FL (US) 33316; Mary E Tafoya, 2107 Mariner Dr., Fort Lauderdale, FL (US) 33316; Samuel Barran Tafoya, 135 - 41st Street Cir. East, Bradenton, FL (US) 34208

( * ) Notice: Subject to any disclaimer, the term of this patent is extended or adjusted under 35 U.S.C. 154(b) by 0 days.

(21) Appl. No.: 11/374,589

(22) Filed: Mar. 14, 2006

(51) Int. Cl.
*B61L 3/12* (2006.01)
*H02K 41/00* (2006.01)
(52) U.S. Cl. ......................... 290/1 R; 310/12
(58) Field of Classification Search ............... None
See application file for complete search history.

(56) References Cited

U.S. PATENT DOCUMENTS

| | | | | |
|---|---|---|---|---|
| 4,092,554 | A * | 5/1978 | Quinn | 104/292 |
| 4,742,283 | A * | 5/1988 | Bolger et al. | 318/587 |
| 4,800,328 | A * | 1/1989 | Bolger et al. | 320/106 |
| 4,800,978 | A * | 1/1989 | Wasa et al. | 180/168 |
| 4,806,805 | A * | 2/1989 | Pinchefsky | 310/112 |
| 4,836,344 | A * | 6/1989 | Bolger | 191/10 |
| 5,573,090 | A * | 11/1996 | Ross | 191/10 |
| 5,821,728 | A * | 10/1998 | Schwind | 320/108 |

FOREIGN PATENT DOCUMENTS

| | | | |
|---|---|---|---|
| DE | 10223241 A1 | * | 12/2003 |
| JP | 58080938 A | * | 5/1983 |
| JP | 62040507 A | * | 2/1987 |
| WO | WO 2004062959 A1 | * | 7/2004 |

* cited by examiner

*Primary Examiner*—Joseph Waks
(74) *Attorney, Agent, or Firm*—Dorothy S. Morse

(57) ABSTRACT

A system and method whereby power pods having multiple permanent magnets or coils of wire with a very low voltage charge create a multiple magnetic fields within frequently traveled roadways and other surfaces so that voltage is created when vehicles carrying ferrous metal pass over it. The most efficient areas for electrical generation are the downhill sides of bridges, hills, and mountain grades, although the power pods may be used on substantially flat surfaces if not too closely spaced together to drain inertia from passing vehicles. An added benefit on inclined surfaces, the magnetic field would have a speed-reducing effect on the vehicles. Enhancement of electrical generation via the present invention system could be achieved by installing a permanent magnet on vehicular and railroad traffic. Applications may include, but are not limited to, highways and railroads.

20 Claims, 3 Drawing Sheets

VEHICLE ASSISTED POWER GENERATOR

CROSS-REFERENCES TO RELATED APPLICATIONS

None

BACKGROUND—FIELD OF THE INVENTION

This invention relates to the field of power generation using roadway surfaces, specifically to a system and method whereby multiple magnets or coils are embedded in frequently traveled roadways and other frequently traveled surfaces, such as but not limited to railroad beds, to create multiple flux fields wherein the passing of vehicles comprising or carrying ferrous metal over the magnets or coils creates voltage that can be collected, added to a power grid, or stored. Collection and storage of the generated voltage can be achieved by a variety of means. Applications include, but are not limited to, the downhill sides of bridges, hills, and mountain grades.

BACKGROUND—DESCRIPTION OF THE RELATED ART

New sources of power are continually being sought to replace dwindling fossil fuel supplies. Roadway surfaces and the vehicular traffic moving over it have been previously considered as sources of electrical/power generation via the use of mechanically operated devices, such as the generating system disclosed in published U.S. patent application 20040066041 for Hunter (2004) whereby a plurality of linear operating magnetos is impeded within a roadway pavement and passing vehicle wheels depress linear solenoid plungers to generate electricity. The Hunter invention includes vertically spaced-apart coils within elongated hollows each have a central vertical void through which a vehicular-activated plunger moves, with the plungers having magnets mounted thereon that when moved within the coils causes the flow of electrons. Spring action to return the plunger to its original position causes further electron flow. Coil elements in each generating module are connected to a bridge rectifier to generate high-voltage uni-directional voltage pulses. The output of multiple generating modules is then wired in parallel and fed to an electrical storage device, after which a synchronous inverter converts the stored energy to AC line compatible power for distribution to a power network. The present invention is different from the Hunter invention is significant ways. First, the present invention uses power pods having multiple permanent magnets or coils of wire with a very low voltage charge to create a magnetic field. High voltage pulses are not involved, as in the Hunter invention. When vehicle traffic passes over the magnetic field, it provides the ferrous metal movement across the magnetic field to generate a current across positive and negative leads. No mechanical plunger is used, as in the Hunter invention. The most efficient areas for such electrical generation are the downhill sides of bridges, hills, and mountain grades, although they may be used on substantially flat surfaces if not too closely spaced together to drain inertia from passing vehicles. An added benefit for automobiles, trucks, and trains traveling down steep grades would be the speed-reducing effect produced on the vehicles by the magnetic field installed within the roadway. Enhancement of electrical generation via the present invention system could be achieved by simply installing a permanent magnet on board vehicles passing over the roadway surface or railroad bed. Coils and pods are preferably wired in series. Further, the present invention has no mechanically moving parts subject to malfunction, as in the Hunter invention. No other power generation using roadway surfaces and railroad beds is known that functions in the same manner or provides all of the advantages of the present invention.

BRIEF SUMMARY OF THE INVENTION

The primary object of this invention to provide a system of power generation that places groups of magnets and/or coils within heavily trafficked roadway surfaces and railroad beds, mainly on downhill inclines, so that passing vehicles will create voltage that can be collected and routed for productive use. Another object of this invention is to provide a system of power generation using roadway surfaces and railroad beds that may also be used on substantially flat roadway surfaces and railroad beds if not too closely spaced together to drain inertia from passing vehicles. It is a further object of this invention to provide a system of power generation using roadway surfaces and railroad beds that has a very low voltage charge. It is also an object of this invention to provide a system of power generation using roadway surfaces and railroad beds that is non-mechanical and has no moving parts to malfunction. A further object of this invention is to provide a system of power generation using roadway surfaces and railroad beds that has an added speed-reducing benefit for vehicles traveling down steep grades. It is a further object of this invention to provide a system of power generation using roadway surfaces and railroad beds that can be simply enhanced when needed to provide additional electrical generation.

The present invention, when properly made and used, will provide a power generating system that can create a significant amount of electrical energy from the ground travel of motor vehicles and trains over busy roadways, preferably on the downhill sides of bridges, hills, and mountain grades. Substantially flat road surfaces and railroad beds can also be used, if the power generating/collecting units of the present invention are not too closely spaced together to drain inertia from passing vehicles and trains. First, the present invention uses power pods having multiple permanent magnets or coils of electrically conductive wire to create a magnetic field. When traffic passes over the magnetic field, it provides the needed ferrous metal movement across the magnetic field to generate a current across positive and negative leads. The most efficient areas for such electrical generation are the downhill sides of bridges, hills, and mountain grades, although they may be used on substantially flat surfaces if not too closely spaced together to drain inertia from passing vehicles. An added benefit for automobiles, trucks, and trains traveling down steep grades would be the speed-reducing effect produced on the vehicles by the magnetic fields positioned within the roadway surface. Enhancement of electrical generation via the present invention system could be achieved by simply installing one or more permanent magnets on board vehicles passing over the roadway surface or railroad bed. Those using the added permanent magnet could receive a return benefit, perhaps in the form of a toll credit for use of limited access roads and bridges. Coils and pods are both preferably wired in series. The present invention has no mechanically moving parts subject to malfunction, as is prevalent in the prior art.

The description herein provides preferred embodiments of the present invention but should not be construed as limiting its scope. For example, variations in the number of power pods used together in a grouping; the size of each power pod; the length and diameter dimensions of the coils or permanent magnets used in each pod; the number of coils or permanent magnets used in each power pod; and the location of power pods relative to a roadway surface or railroad bed; other than those shown and described herein, may be incorporated into the present invention. Thus the scope of the present invention should be determined by the appended claims and their legal equivalents, rather than being limited to the examples given.

DETAILED DESCRIPTION OF PREFERRED EMBODIMENTS

Figure 4:
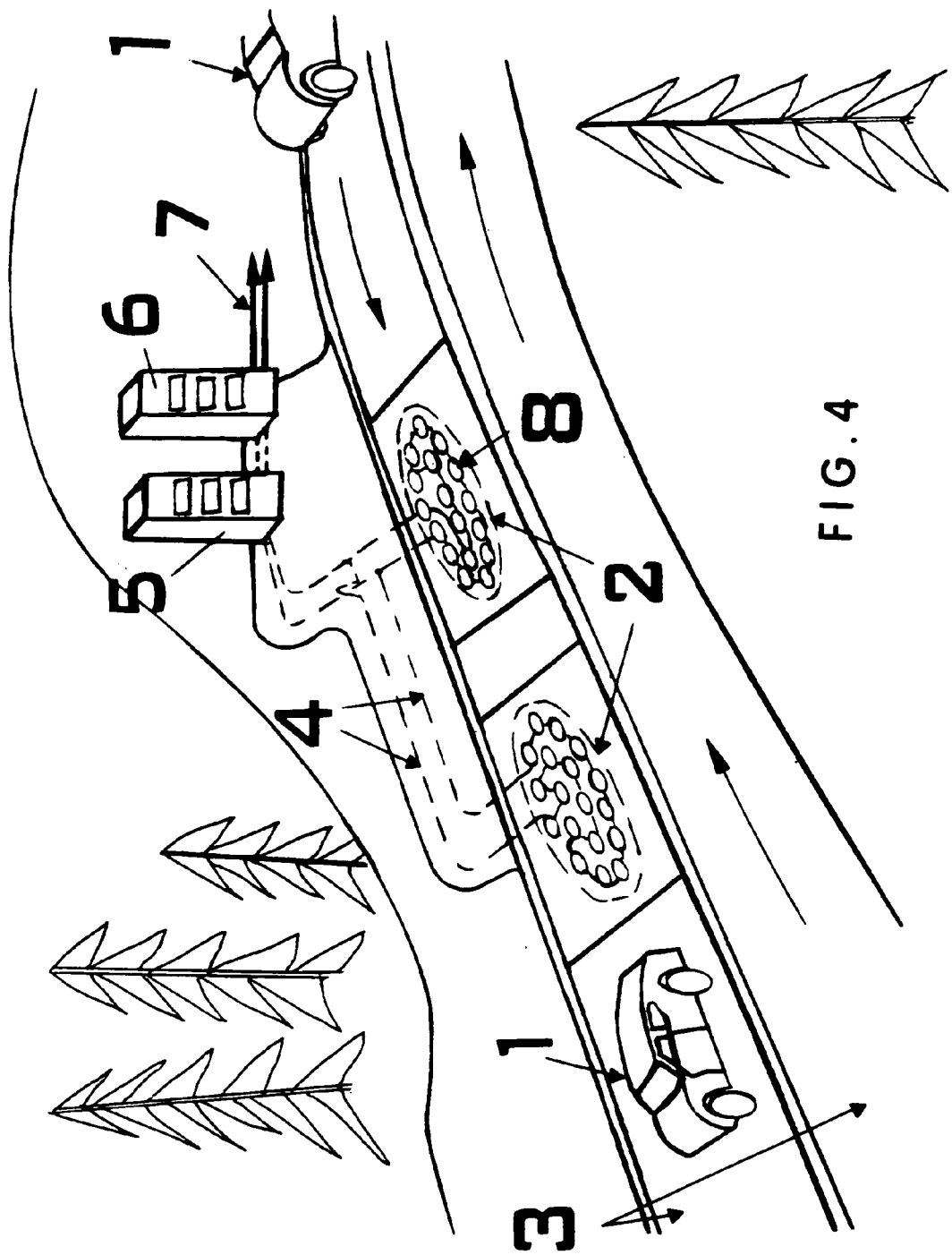
FIG. 4 is a perspective view of two power pods of the most preferred embodiment of the present invention embedded within a downhill roadway surface frequently traveled by motor vehicles and both power pods connected via electrical wiring to power storage unit and subsequently an inverter for converting the stored energy to AC line compatible power for distribution to a power network.

The goal of the present invention is to create or generate a current from the traffic, such as the automobiles shown in FIG. 4 by the number 1, passing over a series of permanent magnets or coils of wire 8 embedded within highways, roadway surfaces, or other surfaces 3 frequently traveled by motorized vehicles 1 carrying ferrous metal, or positioned beneath railroad tracks. It is contemplated that the permanent magnets or coils of wire 8 would have a very low voltage charge. Test prototypes have shown that a current will flow when ferrous based traffic passes over the flux field created by permanent magnets or coils of wire 8. The current generated by a bar of steel (or other ferrous metal) passing near or over the permanent magnets or coils of wire 8 is sensed across the positive to negative leads of a voltmeter (not shown). Thus, when permanent magnets or coils of wire 8 are assembled into horizontally-extending power generating pods 2, as in the present invention, and as traffic passes over pods 2, the permanent magnets or coils of wire 8 create a current in much the same way as a linear generator. Generated/collected current would be high during heavy traffic periods of the day, and less at off-peak travel times. The electrical energy collected could be routed as DC current to batteries or other power storage means, such as but not limited to the power storage unit 5 shown in FIG. 4. In the alternative, the electrical energy generated by pods 2 could be collected by one or more transformers which transfer the DC current to inverters (such as but not limited to the inverter 6 in FIG. 4) for converting it to AC current. Another contemplated alternative relating to storage/use of the power collected from the present invention pods 2, is for the power storage means 5 to be connected to inverter 6. The voltage can then be promptly used, or placed on a local power grid or buss bar (not shown). The most appropriate location for placement of the present invention power generating pods 2 is on the downhill side of bridges, hills, and mountain grades. One disadvantage of the pods 2 is that when they are placed too close together on flat roadways 3, they have the potential to drain inertia from passing vehicles 1, although in most instances the reduction in speed would be imperceptible to the vehicle's operator. However, the drain in inertia can be an advantage on roadways 3 having steep grades. Thus, an important by-product of embedding pods 2 within roadways 3 having steep grades is a speed-reducing effect on motor vehicles 1 that are already attempting to slow so as to maintain control of their speed. The benefit can be enhanced, as needed, by appropriate placement of pods 2. The current generating effect from motor vehicles 1 passing over pods 2 is greatly improved by the simple installation of one or more fixed permanent magnets (not shown) on the undersides of vehicles 1. Such installment could be voluntary at first, particularly in hilly terrain and in mountainous areas where vehicles 1 frequently travel on roadways 3 having a steep grade and would greatly benefit from the slowing effect of pods 2. As more pods 2 are installed in roadways 3 over a period of time, and within flat roadways 3, motor vehicle manufacturers could be enlisted to add fixed permanent magnets to the undersides of vehicles to enhance the amount of current collected. Each power generating pod 2 contains multiple permanent magnets or coils of wire 8 that are wired in series, with multiple power pods 2 also being wired in series, with the two end leads (shown as electrical wiring 4 in FIG. 4) being connected to power storage unit 5 and/or an inverter 6.

The present invention will generate the most current and be most beneficial when imbedded in the downhill traffic lanes of roadway surfaces, bridges, railroad beds, and other surfaces 3 that are frequently traveled by vehicles carrying ferrous metal. The ferrous metal (fixed permanent magnets, not shown) causing the generation of current in pods 2, may be a manufactured part of the motor vehicles 1 traveling over pods 2, or added to vehicles 1 for enhanced power generation purposes. As an incentive for motor vehicle operators to permit the addition of extra fixed permanent magnets to their vehicles 1, they may be given credits for road tolls, bridge tolls, or other road use related fees, or commercial discounts at selected retailers, convenience stores, restaurants, and/or other facilities. When applied to roadways 3, at least one power generation pod 2 would be installed in one or multiple lanes of the roadway 3. For inclined roadway surfaces 3, pods 2 would only be installed in downhill traffic lanes, however, on flat roadways 3, pods could be installed in all traffic lanes. Although flat roadways 3 can be used if pods 2 are spaced a sufficient distance apart to avoid draining inertia from passing vehicles 1, downhill sections of roads and highways 3 are preferred and provide the added benefit of slowing vehicles 1 on steep grades. Another contemplated use is at intersections where vehicles 1 typically slow or are required to stop. The pods 2 are imbedded within the roadway 3, typically under its surface, and can be any configuration and/or diameter dimension, with larger pods 2 generally preferred. Further, pods 2 have non-conductive material (not identified by a numerical designation in the illustrations) separating adjacent coils or permanent magnets 8 within a pod 2. Durable non-conductive resin could be used to fill in void areas in pods 2, but other non-conductive materials could also be used. For cost effective production, most power generating pods 2 in the present invention would be manufactured with the same number of coils or permanent magnets 8, although the number of coils or permanent magnets 8 used is not critical. Further, the number of pods 2 installed in series together in each traffic lane and connected to the same power storage unit 5 or inverter 6 is generally small, as when too many pods 2 are too closely spaced together, pods 2 would drain the inertia from passing vehicles 1. A typically contemplated configuration would contain approximately four pods 2 in a row per traffic lane, in one or more lanes in a roadway 3, with the number of pods 2 actually used being varied according to incline of roadway 3, the size of pods 2 and how much of roadway 3 the pods 2 cover, and the number of vehicles 1 using roadway 3 each day, among other factors. The voltage (not identified by a numerical designation) generated by each pod 2 can vary, such as when vehicles 1 change lanes. Adverse weather does not diminish the power gathering capability of pods 2, and maintenance is minimal since the present invention pods 2 have no moving parts. Further, although not limited thereto, generated voltage could be directed to batteries (such as but not limited to the power storage unit 5 in FIG. 4), an inverter (such as but not limited to the inverter 6 in FIG. 4), a transformer on a nearby telephone pole (not shown), another converter, or combination thereof.

Figure 1:
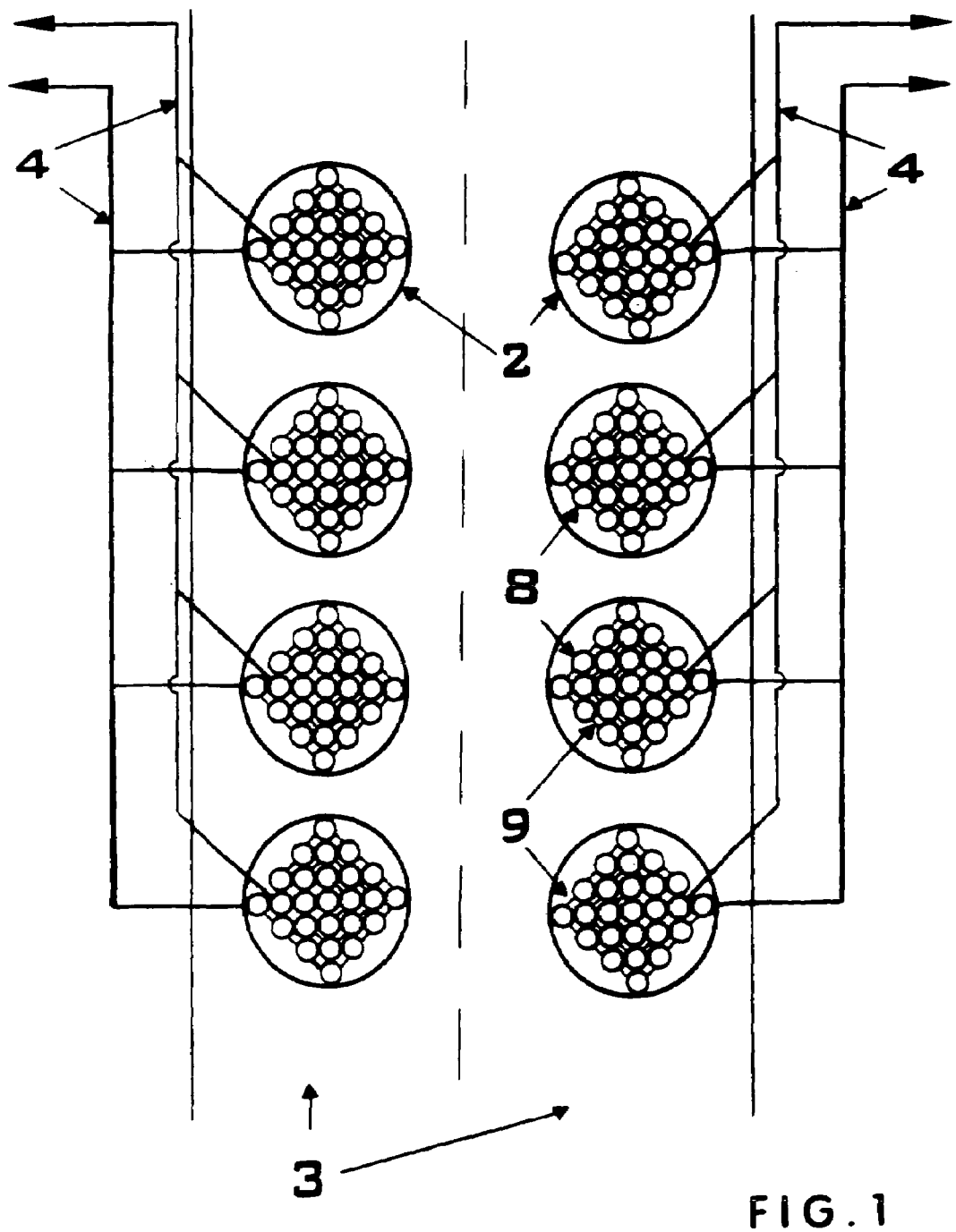
FIG. 1 is a top view of several power pods in a most preferred embodiment of the present invention installed within a roadway surface or railroad bed.
Figure 2:
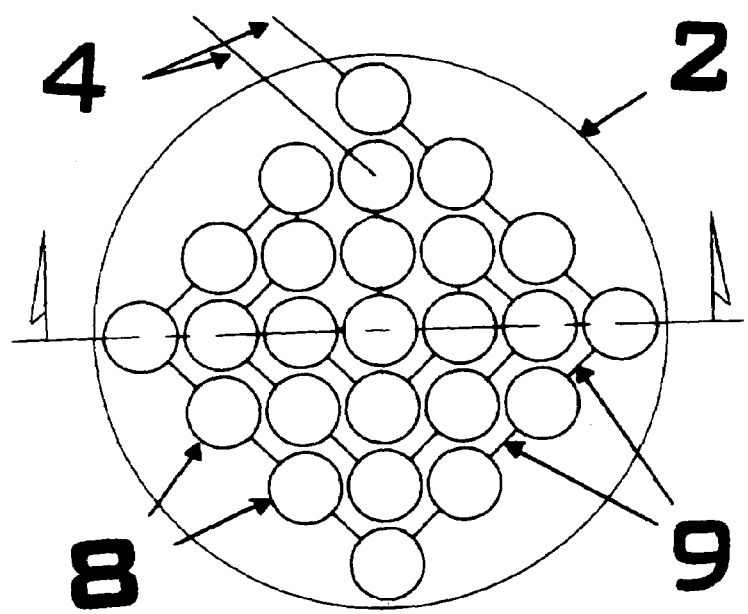
FIG. 2 is an enlarged top view of one of the power pods in the most preferred embodiment of the present invention and showing a preferred wiring patent for its multiple coils.
Figure 3:
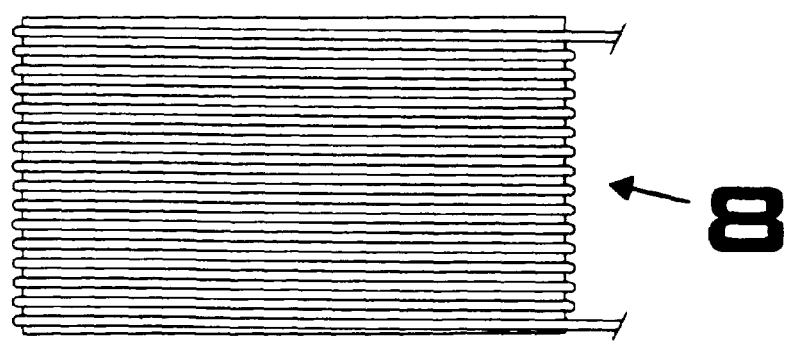
FIG. 3 is a sectional view of one of the coils in a power pod of the most preferred embodiment of the present invention.

FIG. 1 shows four power pods 2 in the most preferred embodiment of the present invention installed within each of the two lanes of a frequently traveled roadway surface 3. On inclined roadways 3, both lanes would be traveling in the same direction. However, for relatively flat roadways 3, the lane for opposing traffic could both contain embedded pods 2. Further, power pods 2 could be installed at all four entrances to an intersection where vehicles 1 typically slow or are required to stop. In the alternative, the arrangement of pods 2 shown in FIG. 1 would also be suitable for a railroad bed. The number of power pods 2 used in a row would be limited, so as not to drain a significant amount of inertia from passing vehicles 1. Other limiting factors to the number of pods 2 used at a site would be the local power collection/use capabilities available and the amount of traffic anticipated. FIG. 1 shows the coils or permanent magnets 8 in each pod 2 connected in series via internal wiring 9, with power pods 2 also being connected in series via electrical wiring 4. Electrical wiring 4 carries the voltage generated by passing vehicles 1 to a battery (see #5 in FIG. 4), a transformer on a nearby power pole (not shown), another transformer (not shown), an inverter (see #6 in FIG. 4), another converter (not shown), or the like. Although size is not critical, larger pods 2 are preferred as they cover more of the roadway surface and increase the likelihood that passing vehicular traffic will interact for longer periods of time with pods 2 for increased voltage generation. Although FIG. 1 shows electrical wiring 4 on both sides of roadway 3, the pods 2 in both lanes of roadway 3 could be connected to the power storage means 5 or inverter 6 on the same side of roadway 3. Although not designated by a number, non-conductive material separates the adjacent coils or permanent magnets 8 within a pod 2, such as but not limited to non-conductive resin. For clarity of illustration in FIG. 1, pods 2 and the coils or permanent magnets 8 are shown in solid lines, even though pods 2 are imbedded within the roadway 3, typically under its surface. Electrical wiring 4 can be buried under the ground, or be above surface, as best suits the locale. Also, although FIG. 1 shows each pod 2 and the coils or permanent magnets 8 contained within each pod 2 having a circular configuration, with the coils or permanent magnets 8 contained within each pod 2 forming a diamond-shaped configuration, any configurations can be used. Further, as shown in FIG. 1, larger pods 2 generally taking up a significant portion of a traffic lane in roadway 3 are preferred. In addition, the diameter dimensions of pods 2, the number of wire coils or permanent magnets 8 in each pod 2, the spaced-apart distances between the pods 2 connected in series, and the location of pods 2 relative to the opposing edges of each traffic lane in roadway 3, shown in FIG. 1, are preferred but not limiting. As an example, the number and size of the wire coils or permanent magnets 8 in each of the pods 2 shown in FIG. 1 could be different, should such variation be demonstrated as beneficial at a given site. However, FIG. 1 shows all pods 2 to be approximately the same size, with the same number of wire coils or permanent magnets 8, which is preferable for cost effective production. FIG. 2 shows an enlarged top view of one of the power pods 2 in the most preferred embodiment of the present invention and a preferred wiring pattern for its multiple coils or magnets 8. The broken section line horizontally extending across the pod 2 in FIG. 2 represents the cross-section taken in FIG. 3. FIG. 3 shows a preferred cross-sectional configuration for one of the wire coils 8 in a power pod 2 of the most preferred embodiment of the present invention, with its two leads (not identified by a separate numerical designation) available for connection in series to other power pods 2, or a battery (see #5 in FIG. 4), a transformer on a nearby power pole (not shown), another transformer (not shown), an inverter (see #6 in FIG. 4), another converter (not shown), or other appropriate storage/use facilitating device. The orientation of wire coils or permanent magnets 8 within roadway surface 3 is not critical to current generation, and power will be generated by passing vehicles 1 whether the longitudinal axis of each wire coil or permanent magnet 8 is perpendicular to, parallel to, or at an oblique angle to, roadway surface 3.

In contrast, FIG. 4 shows spaced-apart two power pods 2 connected in series and imbedded in the downhill traffic lane of an inclined roadway 3 where motor vehicles 1 carrying ferrous metal (not shown) can pass over them to interact with the wire coils or permanent magnets 8 located within the pods 2 for generation of voltage. Electrical wiring 4 connects both of the power pods 2 in FIG. 4 to a power storage unit 5 and subsequently to an inverter 6 used for converting the stored DC energy to AC line compatible power for distribution via power lines 7 to a power network (not shown). The number of coils or permanent magnets 8 located within each pod 2 is not critical and may be the same or different from the other power pod 2, although each is connected in series to an adjacent coil or permanent magnet 8 via the internal wiring 9 shown in FIG. 2, within the same pod 2. Since the inertia drain of power pods 2 on motor vehicles 1 is a potential factor of their use, FIG. 4 only shows power pods 2 embedded in the downhill traffic lane of roadway 3 remote from a viewer, where the traffic slowing potential of the present invention can be maximized as a beneficial by-product of its power generation use.

What is claimed is:

1. An electrical power generating system for use in a roadbed surface to generate electrical current when motorized vehicles carrying ferrous metal pass over the portion of the roadbed surface containing said system, said system comprising:

at least one power pod embedded in a roadbed surface and having a plurality of non-mechanical units that experience no change in original configuration when interacting with motorized vehicles passing over them, said units being electrically connected in series, with each of said units also displaying sufficient magnetic properties to make them capable of generating electrical current when motorized vehicles carrying ferrous metal pass over the portion of the roadbed surface in which they are embedded and also cause nearly imperceptible speed reduction in the passing motorized vehicles, each of said units also having a low voltage charge;

a quantity of electrical wiring connected to said at least one power pod for transferring generated current from said at least one power pod; and electrical means adapted for accepting transfer of said generated current from said at least one power pod, whereby when a motorized vehicle passes over the portion of the roadbed surface containing said system, an unnoticeable amount of inertia is drained from the motorized vehicle while electrical current is generated and transferred away from the roadbed surface for productive use, without said units experiencing any change in original configuration during electrical current generation.

2. The system of claim 1 wherein said units are selected from a group consisting of wire coils and permanent magnets.

3. The system of claim 1 wherein said means for accepting transfer of said generated current from said at least one power pod is selected from a group consisting of DC current power storage units, batteries, transformers, inverters, power converters, local power grids, and buss bars.

4. The system of claim 1 further comprising at least two of said power pods, with said at least two power pods electrically connected in series.

5. The system of claim 4 wherein said at least two power pods are embedded in a roadbed surface with a downhill incline and further wherein said at least two power pods are configured and positioned within said roadbed surface to provide speed reduction to motorized vehicles passing over said at least two power pods.

6. The system of claim 1 wherein the roadbed surface within which said at least one power pod is embedded is a bridge.

7. The system of claim 1 wherein the roadbed surface within which said at least one power pod is embedded is a railroad bed beneath railroad tracks.

8. The system of claim 1 wherein at least one fixed permanent magnet is added to each motorized vehicle passing over said at least one power pod, with said at least one fixed permanent magnet being configured and dimensioned to enhance the amount of said generated current.

9. The system of claim 8 wherein said at least one fixed permanent magnet is selected from a group consisting of magnets added during vehicle manufacture and magnets added after vehicle manufacture.

10. A method for generating electrical power by using said system in claim 1 and motorized vehicles carrying ferrous metal, said method comprising the steps of:

at least one power pod having a plurality of non-mechanical units that experience no change in original configuration when interacting with motorized vehicles passing over them, said units being electrically connected in series, with each of said units also displaying sufficient magnetic properties to make them capable of generating electrical current when motorized vehicles carrying ferrous metal pass over them and also cause nearly imperceptible speed reduction in passing motorized vehicles, each of said units also having a low voltage charge;

also providing a quantity of electrical wiring and electrical means adapted for accepting transfer of said generated current from said at least one power pod and relaying said generated current onward for productive use, a roadbed surface, and a plurality of motorized vehicles;

embedding said at least one power pod in said roadbed surface;

connecting said electrical wiring to said at least one power pod;

also connecting said electrical wiring to said electrical means adapted for transferring said generated current from said at least one power pod; and causing said motorized vehicles to pass over said at least one power pod whereby, while an unnoticeable amount of inertia is drained from said motorized vehicles, electrical current is generated and transferred away from said roadbed surface for productive use without said units experiencing any change in original configuration.

11. The method of claim 10 wherein the order of said steps of providing and also providing can be reversed.

12. The method of claim 10 wherein the order of said steps of embedding, connecting, and also connecting can be reversed.

13. The method of claim 10 wherein said units are selected from a group consisting of wire coils and permanent magnets.

14. The method of claim 10 wherein said means for accepting transfer of said generated current from said at least one power pod is selected from a group consisting of DC current power storage units, batteries, transformers, inverters, power converters, local power grids, and buss bars.

15. The method of claim 10 further comprising at least two of said power pods, with said at least two power pods electrically connected in series.

16. The method of claim 15 wherein said step of embedding further comprises embedding said at least two power pods in a roadbed surface with a downhill incline and further comprising steps of configuring and positioning said at least two power pods to provide speed reduction to motorized vehicles passing over said at least two power pods.

17. The method of claim 10 wherein the roadbed surface within which said at least one power pod is embedded is a bridge.

18. The method of claim 10 wherein the roadbed surface within which said at least one power pod is embedded is a railroad bed beneath railroad tracks.

19. The method of claim 10 further comprising a step of providing at least one permanent magnet configured and dimensioned to enhance the amount of said generated current generated by said at least one power pod, and a step of fixing said at least one permanent magnet to motorized vehicles passing over said at least one power pod.

20. The method of claim 19 wherein said at least one fixed permanent magnet is selected from a group consisting of magnets added during vehicle manufacture and magnets added after vehicle manufacture.

* * * * *